(12) United States Patent
Bergmann

(10) Patent No.: US 6,232,538 B1
(45) Date of Patent: May 15, 2001

(54) SYSTEM AND METHOD FOR DETERMINING MUSIC MODULATION

(76) Inventor: Tim Bergmann, RR 4, Chatsworth (CA), N0H 1G0

( * ) Notice: Subject to any disclaimer, the term of this patent is extended or adjusted under 35 U.S.C. 154(b) by 0 days.

(21) Appl. No.: 09/690,852

(22) Filed: Oct. 18, 2000

(51) Int. Cl.[7] ................................ G10C 3/12; G09B 15/02
(52) U.S. Cl. ...................... 84/471 R; 84/442; 84/470 R; 84/474
(58) Field of Search ................................ 84/442–443, 445, 84/451, 470 R, 471 R, 472–475, 477 R, 483.1, 483.2

(56) References Cited

U.S. PATENT DOCUMENTS

| | | | |
|---|---|---|---|
| 4,305,323 | * 12/1981 | Graham | 84/474 |
| 4,961,362 | * 10/1990 | Gunn | 84/474 |
| 5,370,539 | * 12/1994 | Dillard | 84/471 R |
| 5,709,552 | * 1/1998 | LeGrange | 84/474 |

* cited by examiner

Primary Examiner—Robert E. Nappi
Assistant Examiner—Marlon T. Fletcher
(74) Attorney, Agent, or Firm—Bereskin & Parr

(57) ABSTRACT

A system for determining a musical modulation from a source key to a target key, such that the source key and the target key are selected from a cycle of musical keys. The system includes a relational tool and a bridging tool. The relational tool is capable of determining a primary modulation reference correlated to the displacement between the source key and the target key. The bridging tool includes a selected set of at least one bridge. The selected set is correlated to the primary modulation reference. The present invention also has a method for determining a musical modulation from a source key to a target key, such that the source key and the target key are selected from a cycle of musical keys. The method includes the steps of providing a plurality of bridges indicated in a generic notation, wherein each bridge is correlated to a modulation reference; selecting the source key and the target key; determining a primary modulation reference correlated to the displacement between the source key and the target key; selecting a bridge correlated to the primary modulation reference; and translating the selected bridge from generic notation to a standard musical notation.

18 Claims, 5 Drawing Sheets

10

WHEN THE TARGET KEY IS "1"

```
                                    * - 6/8 - 8 - 1        ⎫
                              * - 3 - 1/3 - 8 - 6/8 - 1    ⎪
                            * - 10/* - 5/3 - 6Maj7 - 1     ⎪
                                 * - 7/9 - 9 - 8sus - 8 - 1⎬ 30A
                      * - 2min - 2 - 4min - 4 - 6 - 8 - 1  ⎪
              * - */10 - 8 - 8/6 - 5 - 5/3 - 6/8 - 8 - 1   ⎪
    * - 7/11 - 9min - 5 - 1 - 8/* - 10min - 6 - 8 - 1      ⎭
```

14 →

WHEN THE TARGET KEY IS "2"

```
                                        * - 7/9 - 9 - 2    ⎫
                                       * - 9sus - 9 - 2    ⎪
                                  * - 4min/9 - 7Maj7 - 2   ⎪
                             * - 2sus - 2 - 11min - 7/9 - 9 - 2 ⎬ 30B
                         * - 4min - 5/2 - 9min/5 - 7 - 9 - 2    ⎪
                  * - 7/11 - 5 - */4 - 3 - 10/2 - 9sus - 9 - 2  ⎪
             * - 7sus - 4/8 - 9 - 6/10 - 11min - 7 - 9 - 2      ⎭
```

WHEN THE TARGET KEY IS "3"

```
                                       * - 8Maj7 - 3       ⎫
                                      * - 8/10 - 8 - 3     ⎪
                                 * - 8/3 - 3 - 8 - 10 - 3  ⎪
                              * - 5min - 10 - 8/10 - 3     ⎬ 30C
                           * - 11sus - 11 - 10sus - 10 - 3 ⎪
                       * - 3 - 1/3 - 6 - 8 - 8/10 - 10 - 3 ⎪
            * - 7/11 - 9min - */7 - 3 - 10/2 - *min - 8 - 10 - 3 ⎭
```

WHEN THE TARGET KEY IS "4"          ← 40

```
42 →                                  * - 2 - 9Maj7 - 4    ⎫
                                     * - 11sus - 11 - 4    ⎪
                               * - 9min/6 - 11sus - 11 - 4 ⎪
                                * - 9sus - 9 - 11sus - 11 - 4 ⎬ 30D
                        * - 4sus - 4 - 6min - 4/8 - 9 - 11sus - 11 - 4 ⎪
                     * - */4 - 5 - 2/6 - 7 - 4/8 - 9 - 9/11 - 11 - 4   ⎪
                 * - 7/11 - 10 - 5/9 - 7 - 2/6 - 11sus - 11 - 4        ⎭
```

WHEN THE TARGET KEY IS "5"

```
                                        * - 10/* - * - 5   ⎫
                                      * - 5 - 10 - 3 - 5   ⎪
                              * - 10/* - 1Maj7 - 3 - 5     ⎪
                          * - 8 - 3 - 3/5 - 10/* - 5       ⎬ 30E
                         * - */10 - 5/9 - 7min - * - 5     ⎪
                         * - 9min - 2min - 10Maj7 - 5      ⎪
                 * - 7/11 - 10 - 5/9 - 8 - 10 - 10/* - * - 5 ⎭
```

WHEN THE TARGET KEY IS "6"

```
                                    * - */2 - 3 - 11Maj7 - 6  ⎫
                                 * - 3/5 - 8/10 - 11/1 - 6    ⎪
                              * - 2sus - 2 - 1sus - 1 - 6     ⎪
                           * - 11sus - 11 - 11/1 - 1 - 6      ⎬ 30F
                        * - 9sus - 9/11 - 11sus - 11/1 - 6    ⎪
              * - */10 - *min/8 - 10min/6 - 8/5 - 11/1 - 6    ⎪
     * - 7/11 - 9min - 5 - 1 - 1/10 - 11 - 11/3 - 1 - 6       ⎭
```

WHEN THE TARGET KEY IS "7"

```
                              * - 7 - 2 - 7
                            * - */2 - 2 - 7
                    * - 10/* - 2/* - */2 - 7
                    * - 9/11 - 2/4 - */2 - 7
                   * - 3 - 10 - */2 - 2 - 7
            * - 4min/2 - 9min/2 - 7/2 - 2 - 7
    * - 7/11 - 9min - */7 - 5 - */4 - */2 - 2 - 7
```
30G

WHEN THE TARGET KEY IS "8"

```
                              * - 3 - 1/3 - 8
                        * - 8/5 - 3/7 - 1/3 - 8
                        * - */9 - */5 - 1Maj7 - 8
                       * - 10min/1 - 1/5 - 3/1 - 8
                         * - 4sus - 4 - 6sus - 6 - 8
                       * - 8 - 10 - 1 - 3 - 4 - 6 - 8
          * - 10dim - 5/9 - 5min/8 - 5min - 3 - 1 - 3 - 8
```
30H

WHEN THE TARGET KEY IS "9"

```
                              * - 7/9 - 2/4 - 9
                           * - 7Maj7 - 2Maj7 - 9
                            * - 11min - 4 - 2/4 - 9
                         * - */2 - 2 - 2/4 - 4 - 9
                         * - 9min/2 - 4sus - 4 - 9
                       * - 3 - 10 - 5 - 4sus - 4/8 - 9
    * - 7/11 - 9min - */7 - 5 - */4 - */2 - 2 - 2/4 - 4 - 9
```
30I

WHEN THE TARGET KEY IS "10"

```
                              * - 3/5 - 5 - 10
                            * - 3 - 10 - 5 - 10
                           * - 3 - 3/5 - 5 - 10
                         * - 3 - 1/3 - 6 - 8 - 10
                       * - 10/* - 8/* - 3/5 - 5 - 10
                     * - 7/11 - 3Maj7/10 - 3/5 - 10
        * - 7/11 - 9min - */7 - 10 - 5/9 - 7min - 3 - 5 - 10
```
30J

WHEN THE TARGET KEY IS "11"

```
                             * - 1dim - 4/6 - 6 - 11
                           * - 3 - 1/3 - 6 - 4/6 - 11
                          * - 9sus - 9 - 6sus - 6 - 11
                          * - 7sus - 7 - 6sus - 6 - 11
                     * - */9 - 5 - 8/5 - 6 - 4Maj7 - 11
               * - 11sus - 11 - 1min - 11/3 - 4 - 4/6 - 6 - 11
           * - 7/11 - 9min - 7 - 4sus - 4/8 - 6sus - 6 - 11
```
30K

SYSTEM AND METHOD FOR DETERMINING MUSIC MODULATION

FIELD OF THE INVENTION

This invention relates to the field of music, and in particular, to the modulation of music from one key to another.

BACKGROUND OF THE INVENTION

Music based on the Western scale utilizes the twelve different tones or notes in the Western scale, which repeat in cycles or "octaves". The common names for these twelve notes are: A, A# or Bb, B, C, C# or Db, D, D# or Eb, E, F, F# or Gb, G, G# or Ab. There is a fixed distance between every note and its predecessor (or successor) in the scale, referred to as a semitone. Thus, travelling up the scale, the note E is always the same distance (of four semitones) from C (within any particular octave). Since the displacements between every successive note (in a chromatic scale) are the same, different pairings of notes may share equivalent relative displacements. For example, G is also four semitones above D# (as is E above C).

Combinations of these twelve notes are grouped together following accepted Western tonal conventions to form scales (commonly, "major" or "minor" scales) based on and commencing with a main or root note. Accordingly, each type of scale (eg. major or minor) has twelve different tonally distinct variations, each based on a different root note. Generally, works or passages of music are based on these different scales, which are designated through the use of "key signatures".

In music, the key signatures, or more simply the "keys" may change frequently, both within a single piece of music, and between one piece and the next. Following the performance of music in a first key, the audience's ears will have become tuned to that key. With an immediate change to a new key, the music in the new key will typically sound discordant until the listeners' ears have become attuned to the new key. Where different pieces of music are intended to be heard separately and a distinct pause is provided between pieces of music, this is not a problem. However, often it is desirable to have one piece of music flow directly into a following piece, and if the keys of the two pieces are different, this can sound harsh or discordant to a listener.

A technique known as "bridging" or "modulating" is known for gradually transitioning the listener's ears from one key to another. Bridging typically involves the use of a progression of chords which lead the listener from the first key to establish the new key. Bridges often include chords which are common to both keys. Bridges are commonly used when the key signature changes within a single piece of music. Bridges can also be used to transition from one piece of music to a second piece of music in a different key.

In a live performance of music, frequently one piece of music will follow another which has been written in a different key. In order to avoid providing a reasonable pause, otherwise required so that the second piece of music does not sound discordant to the audience, the performers will typically have to develop a bridge to provide a smooth transition in the music from the first key to the new key. The process of creating an appropriate bridge requires skill and musical creativity and can be a time-consuming and difficult task, particularly for novice musicians.

Prior art techniques are known for providing a bridge between one key signature and another. However, the prior art includes a bridge specifically prepared for each specific key to key transition. Since there are twelve different key signatures, each of which can bridge to one of the other eleven key signatures, the prior art requires one hundred and thirty-two different prepared bridges, which can be referenced for the specific key change. This prior art technique provides only a single chord progression for each specific key transition.

There is accordingly a need for systems and methods which make it easier and more efficient for musicians to prepare a musical bridge from one key to another.

SUMMARY OF THE INVENTION

The present invention is directed towards a system and method for assisting in the preparation of modulations from one key to another.

In one aspect, the system of the present invention is used for determining a musical modulation from a source key to a target key, wherein the source key and the target key are selected from a cycle of musical keys. The system includes a relational tool and a bridging tool. The relational tool is adapted to determine a primary modulation reference correlated to the displacement between the source key and the target key. The bridging tool comprises a plurality of bridges, wherein each bridge is indicated by a generic notation, whereby in use, one bridge can be selected that is correlated to the primary modulation reference.

The present invention is also directed toward a method for determining a musical modulation from a source key to a target key, wherein the source key and the target key are selected from a cycle of musical keys. The method comprises the following steps:

A. providing a plurality of bridges indicated in a generic notation, wherein each bridge is correlated to a modulation reference;

B. selecting the source key and the target key;

C. determining a primary modulation reference correlated to the displacement between the source key and the target key;

D. selecting a bridge correlated to the primary modulation reference; and

E. translating the selected bridge from generic notation to a standard musical notation.

BRIEF DESCRIPTION OF THE DRAWINGS

The present invention will now be described, by way of example only, with reference to the following drawings, in which like reference numerals refer to like parts and in which:

FIGS. 3A and 3B together are a schematic diagram of a preferred embodiment of the bridging tool of the subject invention.

DETAILED DESCRIPTION OF THE PREFERRED EMBODIMENT

Figure 1:
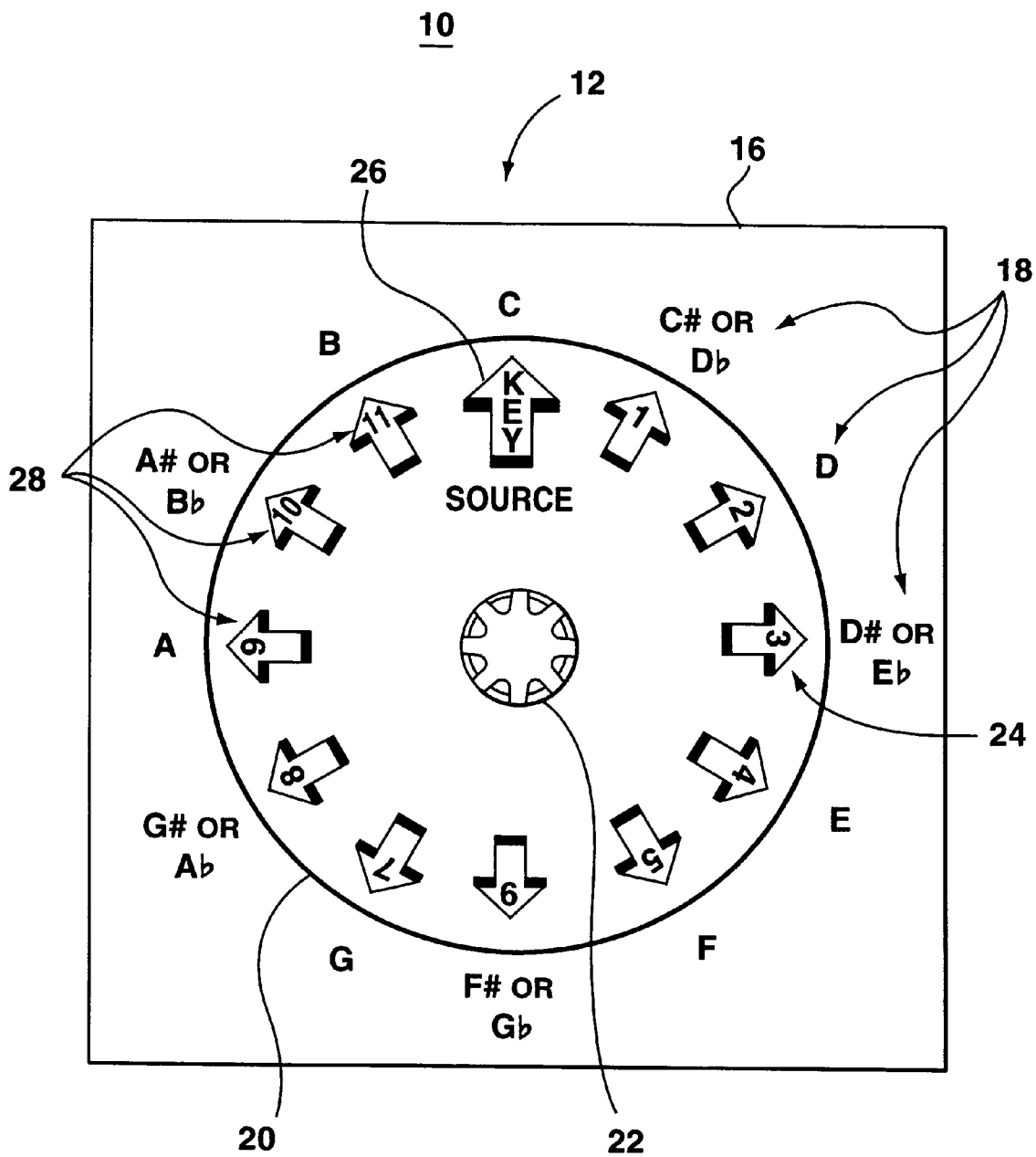
FIG. 1 is a top view diagram of a preferred embodiment of the relational tool of the subject invention.

Referring simultaneously to FIGS. 1 and 3A and 3B, illustrated therein is a music modulation system shown generally as 10 made in accordance with a preferred embodiment of the subject invention. Music modulation system 10 comprises a relational tool 12 and a bridging tool 14.

Relational tool 12 comprises a base platform 16 on which twelve musical indicia 18, correlated to each of the various root notes and key signatures available in the Western scale, are inscribed evenly spaced in a circular pattern. As will be understood by one skilled in the art, each of the semitones in the Western chromatic scale are reflected in the musical indicia 18. The relational tool also includes a displacement disc 20 which is rotatably mounted to the base platform 16 for rotation about a pivot point 22. Inscribed on the disc 20 evenly spaced about a circular pattern are relational indicia 24 including a source key marking 26 and displacement markings 28 consecutively numbered from "1" to "11". Thus, it will be appreciated that the twelve musical indicia 18 and also the twelve relational indicia 24 are, respectively, spaced approximately 30° apart.

Figure 2:
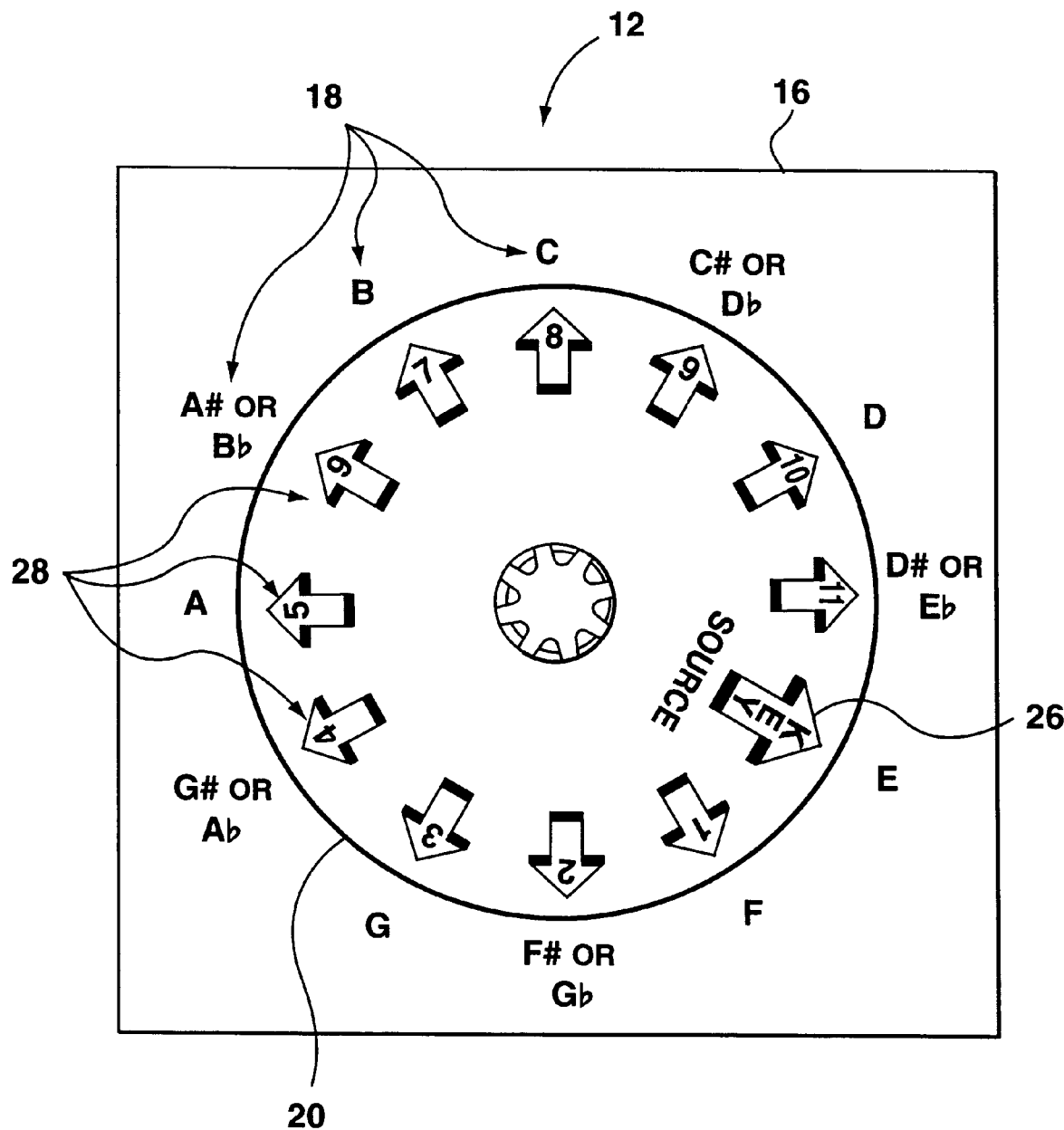
FIG. 2 is a top view diagram of a preferred embodiment of the relational tool of FIG. 1, with a displacement disc rotated to a second position relative to a base platform.

As can be seen in FIGS. 1 and 2, the twelve relational indicia 24 (26 & 28) correspond in quantity to the twelve musical indicia 18. When the displacement disc 20 is rotated to a position such that the source key marking 26 is aligned with a desired root note/key signature on the base platform 16, a relative displacement between the desired root note/key signature and every other possible root note/key signature can be determined by matching the respective musical indicia 18 with the correlated aligned relational indicia 24.

For example, in FIG. 1, the source key marking 26 is aligned with the musical indicia 18 for the key of "C" (major or minor). The alignment of the relational indicia 24 with the musical indicia 18 indicates that "D#" (D sharp) or "Eb" (E flat) (which is the tonal equivalent of D#) has a relational displacement of "3" from "C". Similarly, in FIG. 2, the source key marking 26 has been aligned with the musical indicia 18 for the key of "E". The alignment of the relational indicia 24 with the musical indicia 18 indicates that "F" has a relational displacement of "1" from "E". For each setting, it will be understood that the numerical rational displacement of each keys from the source key is given by the numerical values marked on the relational indicia 24.

As should be understood, instead of having the relational indicia 24 marked on the disc 20 and the musical indicia 18 marked on the platform 16, the musical indicia 18 could be marked on the disc 20 and the relational indicia 24 could be marked on the platform. Additionally, as an alternative to the base platform 16 and displacement disc 20, other suitable means may be used for determining the musical displacement between one note or key signature and another. For example, a roller rotating about a base axle may be used with one set of the indicia (18, 24) marked on the peripheral surface of the roller, for alignment with the other set of the indicia (18, 24) marked on the end of the axle. Further, the two sets of indicia could be marked on two side by side cylinders or rollers, so as to be on a common cylindrical surface, the two rollers being moved to relative rotation between them. As a further alternative, the musical displacement could be determined through reference to a chart listing all of the note names on both perpendicular x and y axes.

Referring now to FIGS. 3A and 3B, the bridging tool 14 comprises eleven different sets 30A–30K of bridges. The eleven sets 30A–30K of bridges are correlated to the eleven possible key changes that are available from any given key. The bridges 32 in each set 30A–30K provide a series of chord progressions indicated by chord symbols (including the "*", and numbers "1" to "11"). Each of the chord symbols correlates to the twelve relational indicia 24. The "*" symbol correlates to the source key marking 26, and the numerical symbols correlate to their numerical equivalents of the displacement markings 28, as will be explained in greater detail, below. As will be understood by one skilled in the art, different styles of chord symbols may be used to identify chord types.

As should be understood by one skilled in the art, certain chord progressions are more appropriate for particular styles of music. Accordingly, while the sets 30A–30K of bridges may be appropriate for hymns and other traditional religious music, alternative sets 30A–30K of bridges may be developed with chord progressions more typical for a different style of music, such as jazz, rock, pop, etc. As a further alternative, each of the sets 30A–30K of bridges may contain a number of groupings of bridges, each in turn created for a specific musical style.

Figure 4:
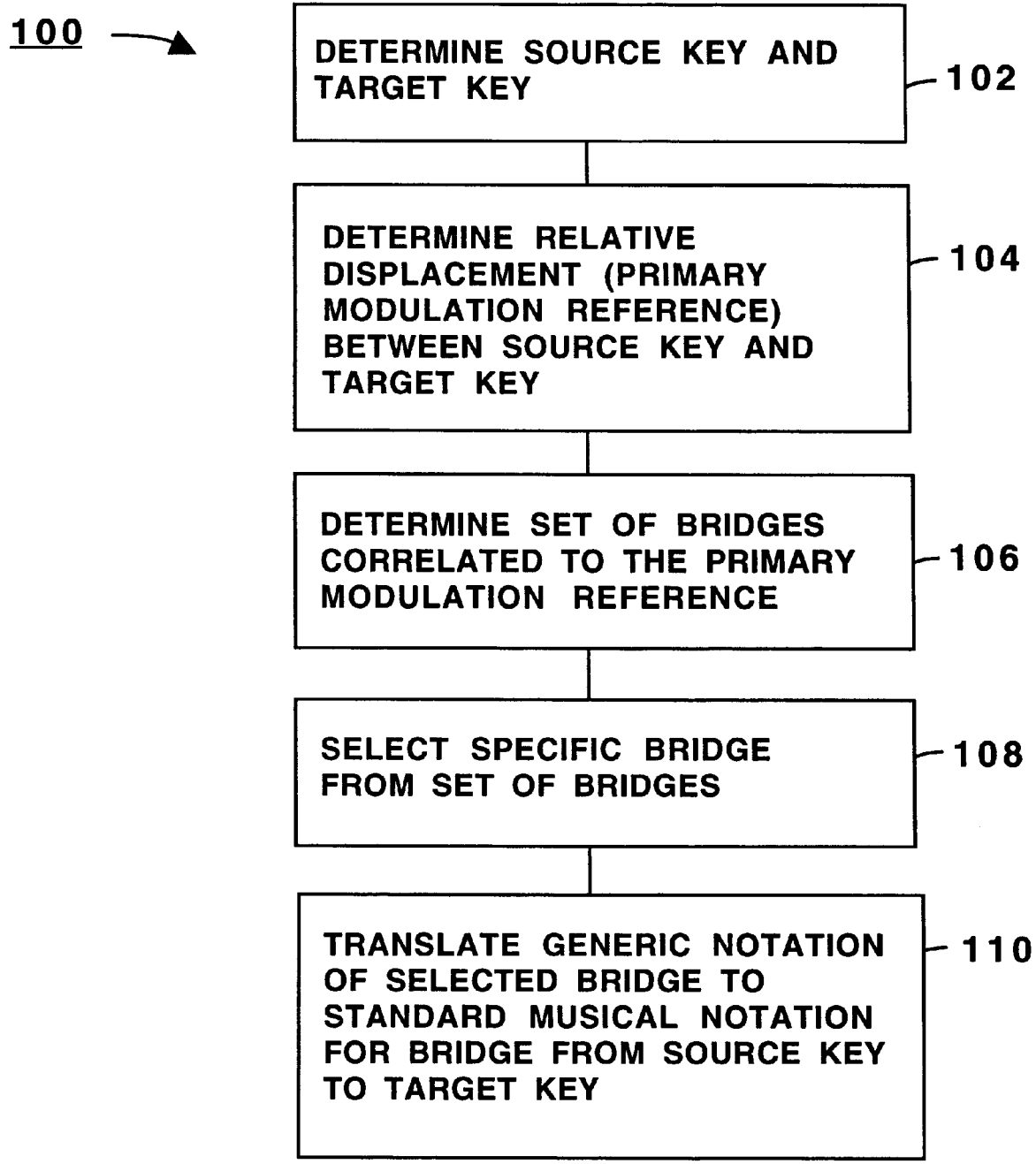
FIG. 4 is a flow diagram of the preferred method of the subject invention.

FIG. 4 illustrates the steps of the method 100 carried out by the system 10 made in accordance with the subject invention. A musician initially determines the letter name of the key signature of the first piece of music, referred to herein as the "source key", and the key signature of the second piece, referred to as the "target key". (Block 102)

The musician then rotates the displacement disc 20 about the base platform 16, to make the source key marking 26 align with the musical indicia 18 which matches the letter name of the source key. As illustrated in FIG. 2, the source key marking 26 has been aligned with the musical indicia 18 for the source key having the letter name "E". Following which, the musician then locates the musical indicia 18 which matches the letter name of the target key, and determines the respective relational indicia 24 aligned with that target key musical indicia 18. (Block 104) The determined relational indicia 24 reflects the relative displacement (in semi-tones) between the source key and the target key (also referred to herein as the "primary modulation reference"). Thus, referring to FIG. 2, if the letter name of the target key is "G#" (or "Ab"), the relational indicia 24 aligned with that target key letter name is "4", indicating that the relational displacement or primary modulation reference between the source key of "E" to the target key of "G#" (or "Ab") is 4 semitones.

Once the relational displacement between the source key and the target key has been determined, the musician determines the specific set of bridges 40 (in FIG. 3A) which is correlated to the primary modulation reference. (Block 106). In the example noted above, where the primary modulation reference (from the key of "E" to "G#") was determined to be 4 semitones, the selected set of bridges 40 is correlated to the relational displacement of 4 semitones. The musician then selects a specific bridge 42 from the bridges in the set 40. (Block 108)

The chord progressions in the various bridges are set out in a generic notation, such that the numbers in the notation for a particular bridge must be correlated to the musical indicia 18, in order to convert the chord progression notation into standard musical notation familiar to most musicians. In converting the chord notation, the musician must match each number in the chord notation to the equivalent number in the displacement markings 28, and select the key name from the respective aligned musical indicia 18—this key name then represents the chord to be inserted into the bridge sequence. A "*" is simply matched with the source key. This must be done for all of the numerical indications in the chord notation (except, for example "Maj 7", the seven of which indicates a particular variant of a chord (the major seventh), as would be understood by one skilled in the art). (Block 110) Continuing the example noted above, the bridge 42 has been selected for a transition from the key of "E" to the key of "G#". In the general chord notation, the bridge 42 reads: "*-11sus–11-4". Upon conversion for the particular key transition from "E" to "G#", the bridge 42 becomes: "E–D#sus–D#–G#". Again, a skilled musician will recognize that "sus" indicates "suspended" (in which the perfect fourth above the root note is substituted for the major third) in known manner.

As should now be understood and can be seen from FIG. 3A, each of the bridges in the set 40 has a chord progression commencing from the same first key (indicated by a "*") and ending in the same second key. It should also be understood that while the eleven different sets 30A–30K of bridges illustrated on the bridging tool 14 are for major key signatures, alternatively, the bridging tool could include bridges developed for minor key signatures.

If the musician decides that the particular selected bridge 42 does not create a harmonically pleasing transition from the first piece to the second, a different bridge can be selected and the conversion process can be repeated (as discussed in relation to Blocks 108–110).

Preferably, the disc 20 is a playable CD (compact disc) or "flash disc" on which modulations correlated to each of the various bridges 32 indicated on the bridging tool 14 have been recorded. Typically only one variation of each modulation will be recorded, rather than for all twelve possible different source keys. Playing back various different modulations correlated to the selected set of bridges 40 may assist the user in selecting an appropriate selected bridge 42 having an appropriate chord progression for the particular music. Preferably, too, the bridging tool 14 will contain information correlating each bridge 32 to the corresponding CD track on which a version of the bridge 32 has been recorded.

As well, preferably the base platform 16 is formed as part of a CD "jewel" storage case, particularly if the disc 20 is a playable CD. The jewel case is then able to protect the CD and minimize damage to the music data recorded on the CD.

The relational tool 12 may also be used as a transposer to assist in transposing music originally written in a first key into a second key. To do so, the musician rotates the displacement disc 20 about the base platform 16, to make the source key marking 26 align with the musical indicia 18 which matches the letter name of the root note of the first key's root chord. For each chord in the music, the musician locates the chord's root note letter name in the musical indicia 18 and then writes down (or otherwise records) the corresponding relational indicia 24. The musician then aligns the source key marking 26 with the second key (into which the musician intends to transpose the music). For each "numbered" chord in the music, the musician writes down the chord's transposed root letter name indicated by the musical indicia 18 corresponding to the relational indicia 24 matching the chord's number.

Thus, while what is shown and described herein constitutes preferred embodiments of the subject invention, it should be understood that various changes can be made without departing from the subject invention, the scope of which is defined in the appended claims.

I claim:

1. A system for determining a musical modulation from a source key to a target key, wherein said source key and said target key are selected from a cycle of musical keys, the system comprising:

(a) a relational tool adapted to determine a primary modulation reference correlated to the displacement between the source key and the target key; and (b) a bridging tool comprising a plurality of bridges, wherein each bridge is indicated by a generic notation, whereby in use, one bridge can be selected that is correlated to the primary modulation reference.

2. The system as defined in claim 1, wherein the plurality of bridges comprises a plurality of sets of at least one bridge, wherein every bridge in each set is correlated to the same modulation reference.

3. The system as defined in claim 2, wherein each bridge of the bridging tool further comprises a plurality of chord progressions from a first key to a second key and wherein the second key for each set is different from the second key for every other set.

4. The system as defined in claim 3, wherein the number of sets of bridges is correlated to the number of keys in the cycle less one.

5. The system as defined in claim 4, wherein each set includes a plurality of bridges.

6. The system as defined in claim 5, wherein the range of the primary modulation reference is from 1 to the number of keys in the cycle less one.

7. The system as defined in claim 6, wherein the relational tool comprises first and second members mounted for relative movement, wherein the first member includes a continuous cycle of musical indicia indicative of different keys and the second member includes a continuous cycle of relational indicia, the relational indicia including a source key marking and a plurality of displacement markings, the first and second member being movable relative to another to align the source key marking with a selected source key selected from the musical indicia on the first member, thereby to bring displacement markings into alignment with respective musical indicia, whereby, the target key can be selected from the musical indicia and the primary modulation reference can be read from the displacement marking aligned with that selected musical indicium.

8. The system as defined in claim 7, wherein the first and second member are planar and mounted for movement around a pivot point, wherein the musical indicia are arranged in a first circle centred on the pivot point and the relational indicia are arranged in a second circle centred on the pivot point.

9. The system as defined in claim 7, wherein the first member comprises a data storage disc which stores previously recorded musical data correlated to at least one bridge.

10. The system as defined in claim 9, wherein the second member comprises a storage case.

11. The system as defined in claim 8, wherein the first and second members are generally cylindrical and mounted for relative rotation about a common axis.

12. A method for determining a musical modulation from a source key to a target key, wherein the source key and the target key are selected from a cycle of musical keys, the method comprising the following steps:

(a) providing a plurality of bridges indicated in a generic notation, wherein each bridge is correlated to a modulation reference;

(b) selecting the source key and the target key;

(c) determining a primary modulation reference correlated to the displacement between the source key and the target key;

(d) selecting a bridge correlated to the primary modulation reference; and (e) translating the selected bridge from generic notation to a standard musical notation.

13. The method as defined in claim 12, wherein each bridge commences in a first undefined key and ends in a second undefined key.

14. The method as defined in claim 13, wherein step (e) comprises correlating the first undefined key of the selected bridge to the source key and correlating the second undefined key of the selected bridge to the target key.

15. The method as defined in claim 12, wherein the plurality of bridges comprises a plurality of sets of at least one bridge and wherein every bridge in each set is correlated to the same modulation reference, and wherein every set is correlated to a different modulation reference than every other set.

16. The method as defined in claim 15, wherein the number of sets of bridges is correlated to the number of keys in the cycle less one.

17. A system for transposing music from an original key having an original key root chord to a transposed key having a transposed key root chord, wherein said original key and said transposed key are selected from a cycle of musical keys, the system comprising:
  (a) a relational tool adapted to determine a transposition reference for an original chord in the music correlated to the displacement between the root note of the original key root chord and the root note of the original chord;
  (b) wherein the relational tool is also adapted to determine a transposed chord correlated to the transposition reference for the original chord;
  (c) wherein the relational tool comprises first and second members mounted for relative movement, wherein the first member includes a continuous cycle of musical indicia indicative of different chord root notes and the second member includes a continuous cycle of relational indicia, the relational indicia including a source key marking and a plurality of displacement markings, the first and second member being movable relative to another to align the source key marking with a musical indicium on the first member correlated to the root note of the original key root chord, thereby to bring displacement markings into alignment with respective musical indicia, whereby the root note for the original chord can be located on the musical indicia and the transposition reference can be read from the relational indicium marking aligned with the located musical indicium.

18. The system as claimed in claim 17, whereby the first and second member are also movable relative to another to align the source key marking with a musical indicium on the first member correlated to the root note of the transposed key root chord, thereby to bring displacement markings into alignment with respective musical indicia, whereby the transposition reference for the original chord can be located in the relational indicia markings and the root note of the transposition chord can be read from the musical indicium marking aligned with the located relational indicium marking.

* * * * *